(12) United States Patent
Diemunsch

(10) Patent No.: US 10,978,930 B2
(45) Date of Patent: Apr. 13, 2021

(54) SLEEVE AND SHAFT FOR AN ELECTRICAL MACHINE

(71) Applicant: INSTITUT VEDECOM, Versailles (FR)

(72) Inventor: Guy Diemunsch, Fontaine (FR)

(73) Assignee: INSTITUT VEDECOM, Versailles (FR)

( * ) Notice: Subject to any disclaimer, the term of this patent is extended or adjusted under 35 U.S.C. 154(b) by 207 days.

(21) Appl. No.: 16/334,292

(22) PCT Filed: Sep. 6, 2017

(86) PCT No.: PCT/FR2017/052358
§ 371 (c)(1),
(2) Date: Mar. 18, 2019

(87) PCT Pub. No.: WO2018/055253
PCT Pub. Date: Mar. 29, 2018

(65) Prior Publication Data
US 2019/0214882 A1      Jul. 11, 2019

(30) Foreign Application Priority Data

Sep. 21, 2016   (FR) ...................................... 16 58872

(51) Int. Cl.
*H02K 7/00*      (2006.01)
*H02K 1/32*      (2006.01)
(Continued)

(52) U.S. Cl.
CPC .............. *H02K 7/003* (2013.01); *H02K 1/32* (2013.01); *H02K 5/1732* (2013.01); *H02K 7/00* (2013.01);
(Continued)

(58) Field of Classification Search
CPC    H02K 7/00; H02K 7/003; H02K 1/32; H02K 5/173; H02K 5/1732; H02K 9/04;
(Continued)

(56) References Cited

U.S. PATENT DOCUMENTS 10,680,487 B2 *   6/2020   Okuno ................... H02K 5/124
2007/0270264 A1 *  11/2007   Grunwald ............... F16D 31/04
475/91

(Continued)

FOREIGN PATENT DOCUMENTS

| EP | 1188215 B1 | 8/2007 |
| EP | 2846439 A1 | 3/2015 |
| WO | WO-2007104875 A1 * | 9/2007 ............. F16D 1/072 |

OTHER PUBLICATIONS

International Search Report for PCT/FR2017/052358 dated Nov. 10, 2017.
Written Opinion for PCT/FR2017/052358 dated Nov. 10, 2017.

*Primary Examiner* — Naishadh N Desai
(74) *Attorney, Agent, or Firm* — Sandberg Phoenix & von Gontard, P.C.

(57) ABSTRACT

The invention relates to a sleeve (1) providing a mechanical connection between a shaft of an electrical machine and a rotational bearing of the electrical machine (100) comprising: —a first portion (3) arranged to co-operate with the electrical machine shaft, —a second portion (5) arranged to co-operate with the rotational bearing, characterized in that the first portion (3) defines at least one internal chamber (4) and comprises at least one means of communication (6) between an environment surrounding the sleeve (1) and the internal chamber (4). Said invention is applicable to motor vehicles.

15 Claims, 4 Drawing Sheets

(51) Int. Cl.
    *H02K 9/06*           (2006.01)
    *H02K 9/14*           (2006.01)
    *H02K 5/173*         (2006.01)
    *H02K 9/22*           (2006.01)
    *H02K 9/04*           (2006.01)
    *H02K 15/00*         (2006.01)

(52) U.S. Cl.
    CPC ................. *H02K 9/04* (2013.01); *H02K 9/06* (2013.01); *H02K 9/14* (2013.01); *H02K 9/22* (2013.01); *H02K 15/00* (2013.01)

(58) Field of Classification Search
    CPC .. H02K 9/06; H02K 9/14; H02K 9/22; H02K 15/00
    See application file for complete search history.

(56) References Cited

U.S. PATENT DOCUMENTS

2012/0104884 A1    5/2012    Wagner et al.
2018/0212485 A1*  7/2018    Chu ....................... H02K 5/161

* cited by examiner

SLEEVE AND SHAFT FOR AN ELECTRICAL MACHINE

CROSS-REFERENCE TO RELATED APPLICATIONS

This application is the US National Stage under 35 USC § 371 of International Application No. PCT/FR2017/052358, filed 6 Sep. 2017 which claims the priority to French application 1658872 filed on Sep. 21, 2016, the content of which (text, drawings and claims) is incorporated herein by reference.

BACKGROUND

The field of the present invention is that of electrical machines, preferably rotary electrical machines, such as generators or motors. More particularly, these electrical machines are intended to be installed in vehicles, in particular motor vehicles, such as road vehicles or trains. These electrical machines are used, for example, to set the vehicle in motion.

The rotary electrical machines, such as generators or motors, comprise a stator and a rotor. Windings forming coils are mounted on the stator, and, for example, permanent magnets are fastened to the rotor. The rotor is rotatable via a shaft. When the electrical machine is a generator, the rotating movement of the rotor opposite the coils of the stator makes it possible to generate electrical energy, and when the electrical machine is a motor, the rotation of the rotor generates mechanical energy.

In the case where these electrical machines are used to set an electric vehicle in motion, the weight of all of the elements on board the vehicle should be minimized, since this weight has a direct impact on the autonomy of a power source responsible for supplying the electrical machine propelling the vehicle. This effort to reduce weight is reflected by an optimization of the compactness of this electrical machine, while keeping the same performance level.

This situation leads to an increase in the heat density produced by the electrical machine. It should therefore be cooled in order to avoid overheating that could cause a reduction in performance, or even destruction of the electrical machine.

SUMMARY

The invention resolves this technical problem by proposing a sleeve providing a mechanical connection between a shaft of an electrical machine and a rotational bearing of the electrical machine comprising:
  a first portion arranged to cooperate with the shaft of the electrical machine, and
  a second portion arranged to cooperate with the rotational bearing, wherein the first portion defines at least one internal chamber and comprises at least one means of communication between an environment surrounding the sleeve and the internal chamber.

Thus, the sleeve makes it possible both to create a fluid passage between the sleeve and the electrical machine shaft so as to cool an internal portion of the sleeve, and correlatively an internal volume of the electrical machine shaft. The fluid passage allows cooling by convection of the sleeve and the electrical machine shaft to which it is connected.

More specifically, the communication means makes it possible to create a passage for the coolant, so as to allow a circulation of coolant between the environment surrounding the sleeve located outside the latter and the internal chamber of the sleeve.

According to various features of the sleeve considered alone or in combination, it is possible to provide that:
  the first portion comprises a plurality of torque transfer walls delimiting the internal chamber, of which at least two adjacent torque transfer walls are separated by at least one communication means. The torque transfer walls provide the transmission of the force while delimiting the internal chamber.
  The communication means is at least one notch.
  At least one torque transfer wall comprises a shoulder configured to form a longitudinal stop opposite the shaft.
  The shoulder is arranged on an internal face of the torque transfer wall. The internal face being the face of the sleeve situated in or opposite the internal chamber. In other words, the internal face is the face of the sleeve located closest to the rotation axis of the sleeve.
  At least one torque transfer wall extends longitudinally along a rotation axis of the sleeve and from a base of the sleeve.
  The torque transfer walls are regularly angularly distributed around a rotation axis of the sleeve, an angular sector for a number N of torque transfer walls being equal to 360/N. For example, if the sleeve comprises four torque transfer walls, the angular sector is equal to 90 degrees, thus each torque transfer wall is arranged every 90 degrees.
  The second portion assumes the form of a trunnion extending along a second rotation axis of the sleeve capable of receiving a rotational bearing of the electrical machine.
  The sleeve is made from steel. Thus, the sleeve can transfer the torque and support the rotational bearings while being lightened by the presence of the communication means.
  The at least one communication means emerges radially from the first portion, relative to a rotation axis of the sleeve. According to one example embodiment, the communication means assumes the form of a radial notch extending in an angular sector around the rotation axis of the sleeve.
  The second portion is solid.

The invention also relates to a hollow shaft for an electrical machine comprising:
  an internal volume,
  a central portion configured to receive a rotor of the electrical machine, and
  at least one end portion configured to cooperate with at least one sleeve, wherein the at least one end portion comprises, on an external periphery, at least one groove intended to cooperate with the sleeve.

According to various features of the hollow shaft considered alone or in combination, it is possible to provide that:
  the shaft comprises at least one longitudinal rib extending inside the internal volume and parallel to a rotation axis of the shaft.
  The shaft is made from aluminum. Thus, the hollow aluminum shaft has good thermal transfer properties and offers ease of manufacturing, in particular for manufacturing by extrusion.

The invention also relates to an assembly for an electrical machine, which comprises at least one sleeve as previously defined and a hollow shaft as previously defined, and wherein the internal volume of the shaft is in communication with the internal chamber of the sleeve.

According to features of the electrical machine considered alone or in combination, it is possible to provide that:

the groove of the shaft cooperates with a contact portion of the torque transfer wall of the sleeve. Thus, according to one example embodiment, four grooves on the external periphery of the shaft cooperate with four torque transfer walls of the sleeve. The cooperation of the grooves and the torque transfer walls is understood as an assembly. For example, the torque transfer walls of the sleeve are assembled with the grooves of the shaft by crimping, soldering, pressing or gluing. Thus, the contact portion of the torque transfer wall is housed in the groove.

An external face of at least one torque transfer wall of the sleeve is flush with an external face of the shaft. The external face is the face of the sleeve located in the surrounding environment of the sleeve. In other words, the external face is the face of the sleeve furthest from the rotation axis of the sleeve. The external surface is the surface of the shaft located in the environment surrounding the shaft. In other words, the external surface is the surface of the shaft furthest from the rotation axis of the shaft. The rotation axis of the sleeve and the rotation axis of the shaft here are combined. Once assembled, the assembly has no external unevenness at their shared junction.

An internal face of at least one torque transfer wall of the sleeve is flush with an internal surface of the shaft. The internal face is the face of the sleeve located in the internal chamber. In other words, the internal face is the face of the sleeve situated closest to the rotation axis of the sleeve. The internal surface is the surface of the shaft situated in the internal volume of the shaft. In other words, the internal surface is the surface of the shaft closest to the rotation axis of the shaft. The rotation axis of the sleeve and the rotation axis of the shaft are combined here.

The invention also relates to an electrical machine which comprises at least one sleeve as previously defined or a shaft as previously defined or an assembly as previously defined.

According to one embodiment, the electrical machine is cooled by a coolant passing at least through the communication means of the sleeve.

DESCRIPTION OF THE FIGURES

Other features, details and advantages of the invention will emerge more clearly upon reading the description provided below for information in connection with drawings, in which.

It should first be noted that the figures describe the invention in detail to carry out the invention, said figures of course being able to be used to better define the invention if applicable.

DESCRIPTION

In the following description, the relative concepts such as "inner" or "outer" are defined relative to a rotation axis R.

The rotation axis R is defined as the axis around which the sleeve and the shaft rotate. The concept of "inner" according to this coordinate system means that the element in question is situated or oriented radially toward the inside of the sleeve and/or the shaft, coming closer to the rotation axis R, while the concept of "outer" according to this coordinate system means that the element in question is situated or oriented radially toward the outside of the sleeve and/or the shaft, moving away from the rotation axis R. A longitudinal axis is defined as the axis along which the sleeve and/or the shaft extends lengthwise, the longitudinal axis and the rotation axis R then being combined. In the following description, reference will also be made to an orientation as a function of the vertical V and transverse T axes, as they are defined by the trihedron R, V, T shown in some of the figures.

Figure 1:
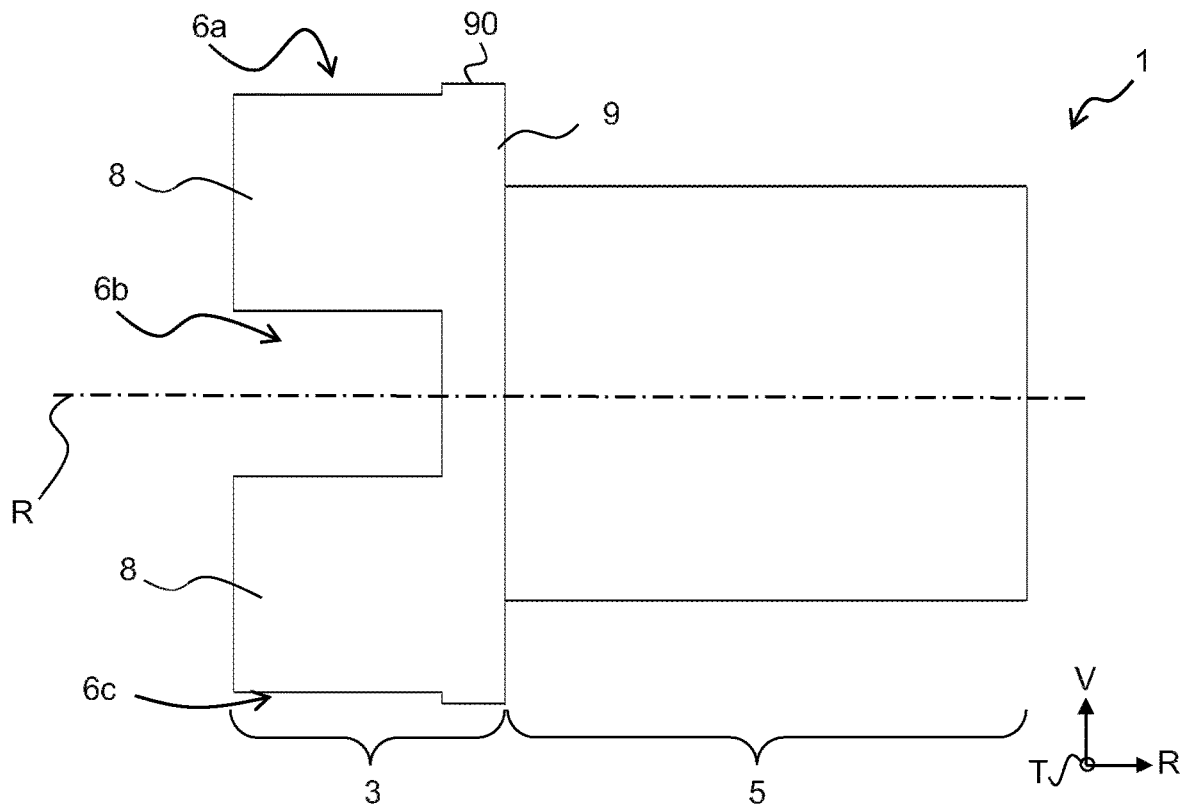
FIG. 1 is a side view of a sleeve.

FIG. 1 shows a sleeve 1 comprising a first portion 3 configured to cooperate with an electrical machine shaft and a second portion 5 configured to cooperate with a rotational bearing of the electrical machine. A base 9 is arranged between the first portion 3 and the second portion 5 and connects the latter, the base being part of the first portion 3 and/or the second portion 5. The sleeve 1 comprising the first portion 3, the base 9 and the second portion 5 are in one piece, advantageously derived from a same material.

The first portion 3 of the sleeve 1 comprises torque transfer walls 8. The torque transfer walls 8 are separated from one another by communication means 6. The communication means 6 are for example notches, a notch corresponding to an indentation, i.e., a removal of material from a portion of the sleeve 1 resulting from molding or machining. Thus, two adjacent torque transfer walls 8, i.e., each situated in the immediate vicinity of one another, are separated by a single notch 6*a*.

The communication means 6 emerge radially relative to the rotation axis R of the sleeve 1. More particularly, each communication means 6 is delimited by an angular sector originating on the rotation axis R of the sleeve 1 and delimited by two lines radial to the rotation axis R of the sleeve 1.

In the example embodiment shown in FIG. 1, the first portion 3 extends over a length smaller than a length of the second portion 5. Non-limitingly, the second portion 5 can be shorter than the first portion 3 in order to provide a connection with a rolling bearing or a rotational bearing or be longer than the first portion 3 in order to arrange a mechanical connection with a gearbox, for example. The exterior diameter of the base 9 is identical to the exterior diameter of a circle in which the transfer walls 8 are inscribed. The diameter of the second portion 5 is smaller than the diameter of the first portion 3. An external face of the second portion is a zone capable of carrying a rotation means, for example a rolling bearing as mentioned below. The communication means 6, in particular in the form of a notch, extends longitudinally here forming a cutout in a ring that forms the first portion 3.

Figure 2:
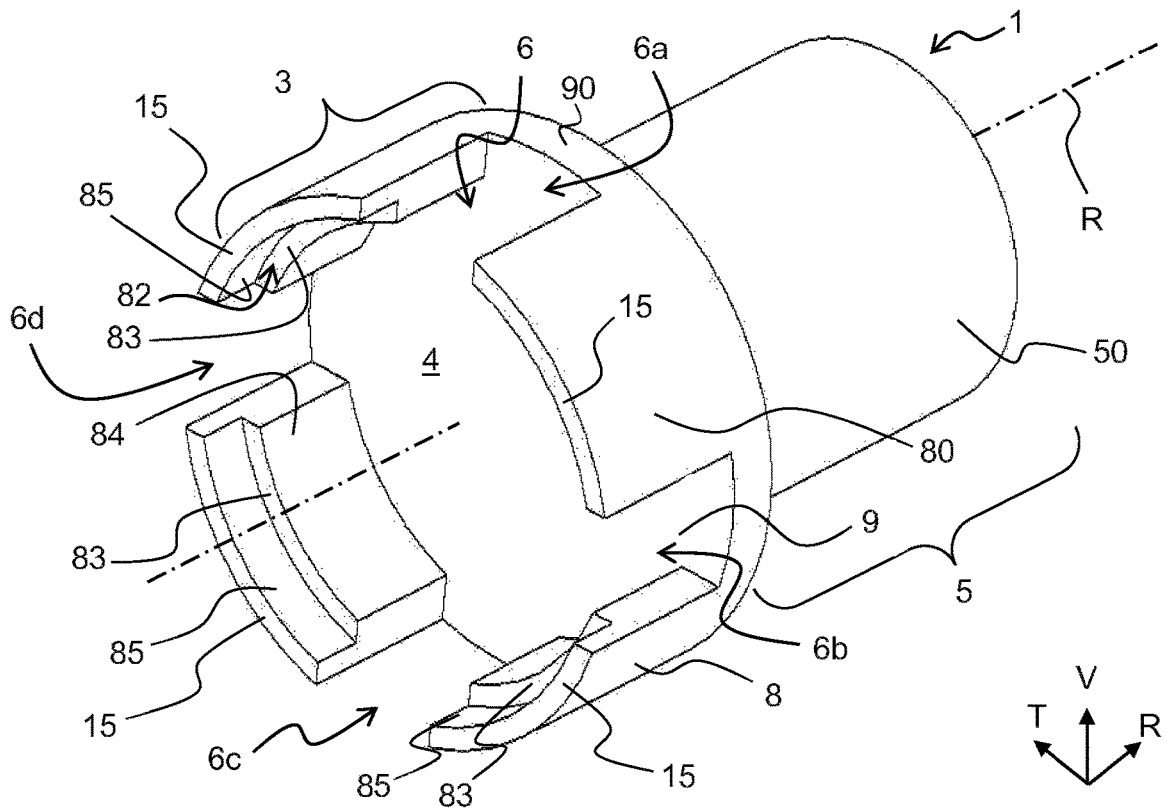
FIG. 2 is a perspective view of the sleeve.

FIG. 2 shows that the set of torque transfer walls 8, of which there are four here, delimits an internal chamber 4. The internal chamber 4 communicates with the surrounding environment of the sleeve 1 via communication means 6. In the preceding exemplary embodiment, four notches 6*a*, 6*b*, 6*c* and 6*d* make it possible to create four passages for coolant between the surrounding environment of the sleeve 1 and the internal chamber 4. These coolant passages allow cooling by convection of the sleeve 1 and the electrical machine shaft to which the sleeve is connected. Of course, the communication means 6 can assume any form other than notches while allowing a circulation of the coolant between the environment surrounding the sleeve 1 and the internal chamber 4.

It should be noted that each torque transfer wall 8 has an external face 80 combined with at least a portion of an external face 90 of the base 9. In other words, the torque transfer walls 8 are situated on the external periphery of the base 9 and the external faces 80 of the torque transfer walls 8 are flush with the perimeter of the base 9. The external faces 80, 90 of the torque transfer walls 8 and the base 9 are the faces situated in the surrounding environment of the sleeve 1. In other words, the external faces 80, 90 of the torque transfer walls 8 and the base 9 are at the faces furthest from the rotation axis R of the sleeve 1.

Each torque transfer wall 8 extends longitudinally along the rotation axis R of the sleeve 1 from the base 9 of the sleeve 1, opposite the second portion 5 relative to the base 9. The base 9 being cylindrical, the torque transfer walls 8 are distributed angularly around the rotation axis R, for example regularly. In general, the angular distribution or angular sector for a number N of torque transfer walls 8 corresponds to 360/N. Thus, with four torque transfer walls 8, each torque transfer wall 8 is arranged every 90 degrees of the base 9 around the rotation axis R.

Figure 3:
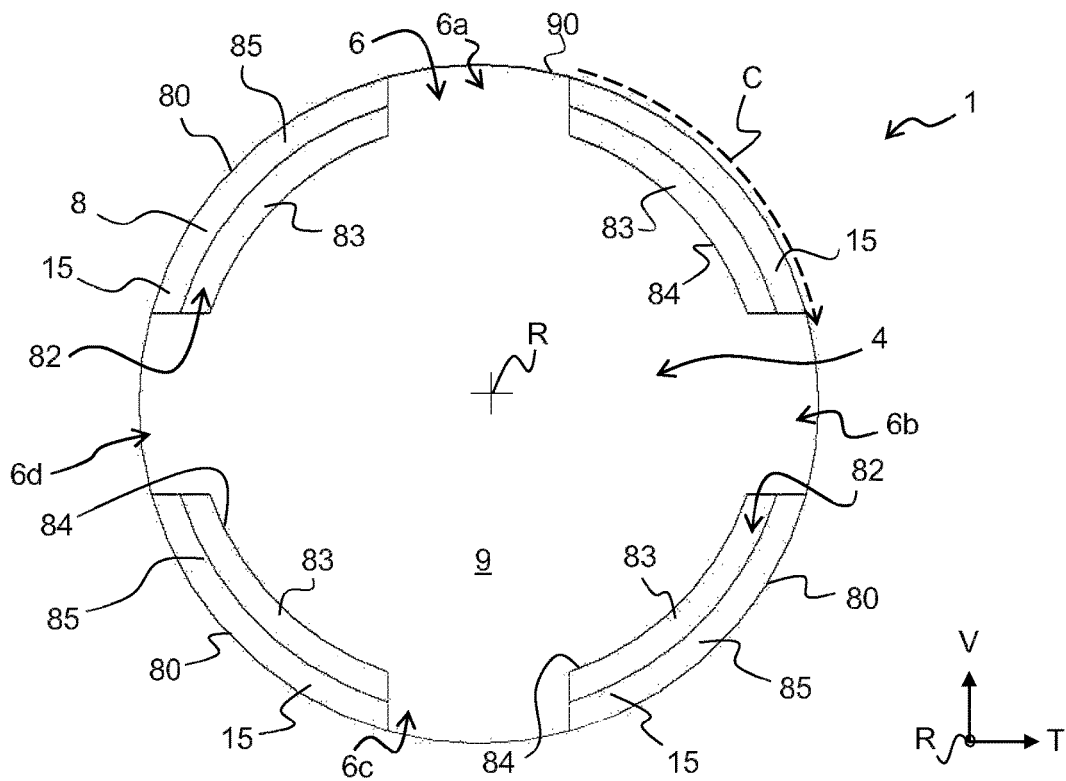
FIG. 3 is a front view of the sleeve.

As shown in FIG. 3, the torque transfer walls 8 extend peripherally over the base 9 along a circular curve C rotating around the rotation axis R. The circular curve C here follows the exterior perimeter of the base 9. Thus, the torque transfer walls 8 perform a transmission function of the mechanical force from the shaft to the second portion 5, or from the second portion 5 to the shaft, based on the use of the electrical machine, while freeing a sufficient internal volume to arrange an internal chamber 4 for circulation of the coolant.

According to one exemplary embodiment, each torque transfer wall 8 comprises at least one shoulder 82 forming a longitudinal stop against which the shaft of the electrical machine bears. This shoulder 82 is made up of an internal face 84 of the torque transfer wall 8. The internal face 84 here is the face of the torque transfer wall 8 that delimits the internal chamber 4. In other words, the internal face 84 is the face of the torque transfer wall 8 located closest to the rotation axis R of the sleeve 1. Such a shoulder 82 is made by a reduction in the thickness of the torque transfer wall 8, at its free end, so as to form a bottom wall 83 against which the shaft is able to bear, this bottom wall 83 being an exemplary embodiment of the longitudinal stop. Such a shoulder 82 has a curved shape and is bordered by a curved face of a torque transfer wall 8. This curved face is intended to come into contact on the shaft and extends primarily along the torque transfer wall 8. This curved face forms a contact portion 85 intended to cooperate with the shaft. This contact portion 85 extends from a free end of the torque transfer wall 8 to the bottom wall 83.

Figure 4:
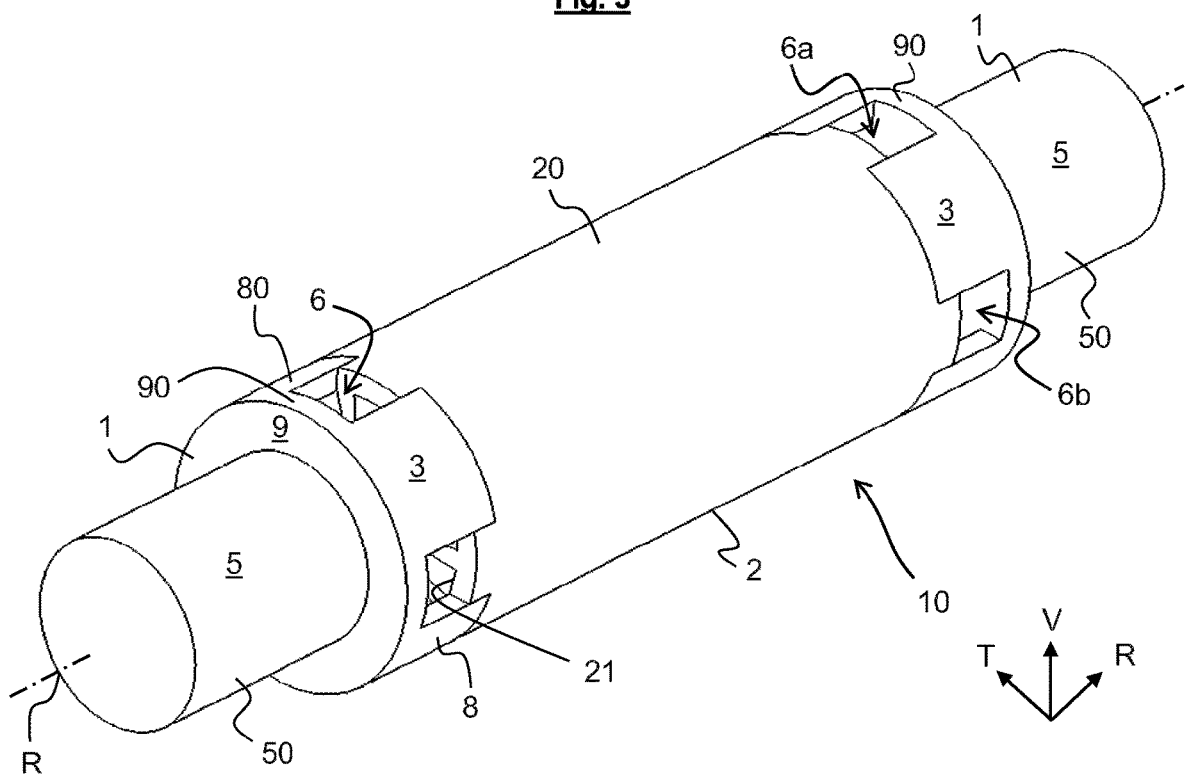
FIG. 4 is a perspective view of an assembly comprising a shaft cooperating with two sleeves of FIG. 1.

As shown in FIG. 2 or 4, the second portion 5 of the sleeve 1 takes the form of a trunnion 50 that extends from the base 9 along the rotation axis R of the sleeve 1 and in a direction opposite the torque transfer walls 8. This trunnion 50 is configured to cooperate with a rotational bearing of the electrical machine. Thus, the sleeve 1 provides the mechanical connection between the shaft of an electrical machine and the rotational bearing of the electric machine. It should be noted that according to the exemplary embodiment illustrated by the figures, the second portion 5, here assuming the form of a trunnion 50, is solid. This means that the second portion 5 is not hollow, that it does not comprise an orifice or chamber. This makes it possible to reinforce the sleeve 1 mechanically.

The sleeve 1 is for example made from metal. Preferably, the sleeve 1 is made from steel. Indeed, the sleeve 1 forms a good compromise to allow both the sleeve 1 to transfer torque, to support the rotational bearings and to be hollowed out to allow the circulation of coolant from its outside environment toward the internal chamber 4 via communication means 6, and vice versa.

Figure 5:
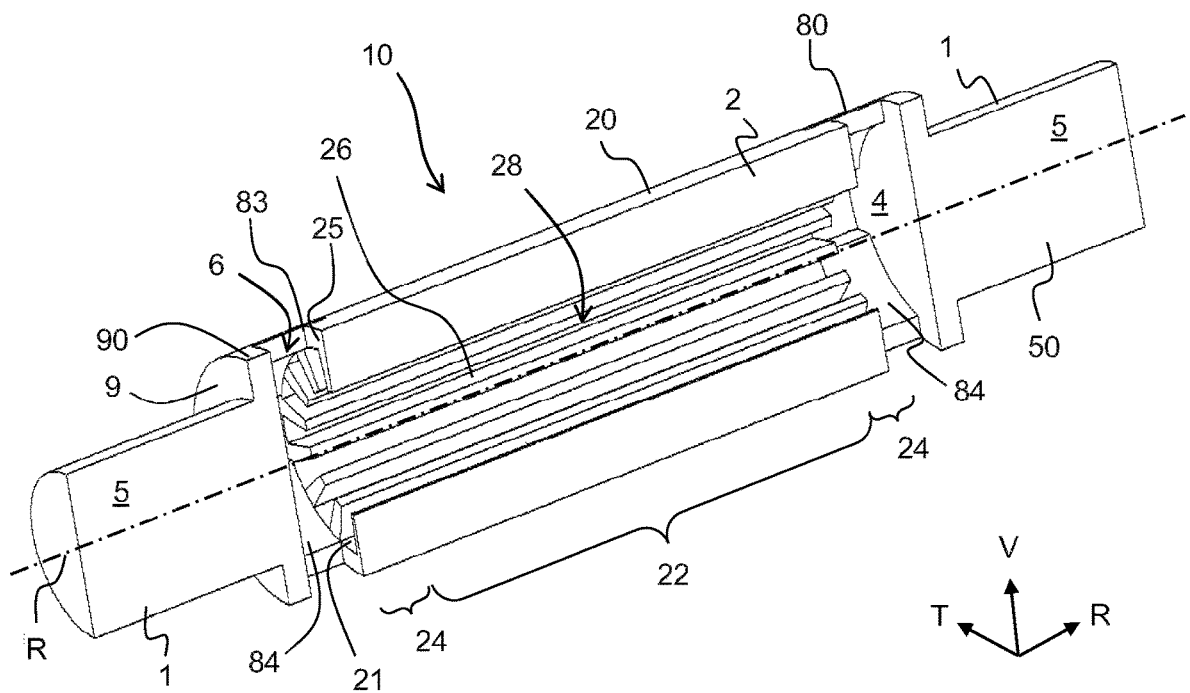
FIG. 5 is a sectional view of the assembly of FIG. 4.

FIGS. 4 and 5 show an assembly 10 for an electrical machine comprising a shaft 2 on which two sleeves 1 are mounted, in particular at each longitudinal end of this shaft 2. It should be noted that the external faces 80, 90 respectively of the torque transfer walls 8 and the base 9 of the sleeve 1 are flush with an outer surface 20 of the shaft 2. Thus, the assembly 10 has no external unevenness. Likewise, the internal faces 84 of the torque transfer walls 8 of the sleeve 1 are flush with an internal surface 21 of the shaft 2.

Thus, according to one exemplary embodiment, four grooves 23 (visible in FIG. 6) situated on the external periphery of the shaft 2 each cooperate with the four torque transfer walls 8 of the sleeve 1, more specifically with the contact portion 85 of the torque transfer walls 8 formed by the curved face that borders the shoulder 82. The cooperation of the grooves 23 and the contact portions 85 forms an assembly connecting the sleeve 1 to the shaft 2. For example, the contact portions 85 of the sleeve 1 are assembled with the grooves 23 of the shaft 2 by crimping, soldering, pressing or gluing. Thus, the contact portion 85 of the torque transfer wall 8 is housed in the groove 23.

The bottom wall 83 of the shoulder 82 bears against an end wall 25 of the shaft 2, as is apparent from FIG. 5. A longitudinal positioning of the sleeve 1 relative to the shaft 2 is thus generated, in the form of a longitudinal stop. Alternatively or additionally, such an abutment can be done by bearing between an end face 15 of the sleeve 1 and a flank 27 that delimits the groove 23 in a radial plane, as shown in FIG. 6.

Furthermore, the shaft 2 is hollow and comprises an inner volume 28 allowing the passage for the coolant from the internal chamber 4 of the first sleeve 1 toward another internal chamber 4 of the second sleeve 1.

Figure 6:
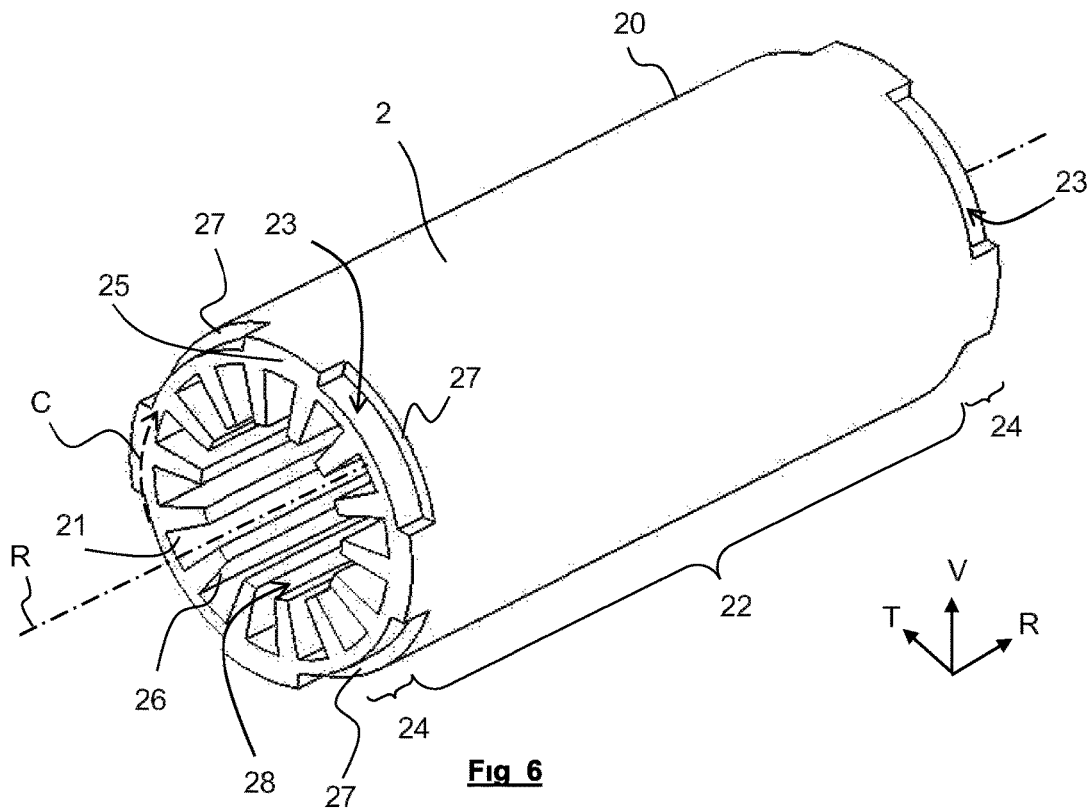
FIG. 6 is a perspective view of a hollow shaft.

The shaft 2, visible in FIG. 6, comprises a central portion 22 configured to receive an electrical machine rotor and end portions 24 on which the sleeves 1 can be mounted in order to form the assembly 10.

The end portions 24 comprise, on an external periphery, the grooves 23 intended to cooperate with the sleeve 1. More specifically, the grooves 23 have a shape complementary to the contact portions 85 and emerge on the end wall 25 of the shaft 2. This end wall 25 extends in a radial plane orthogonal to the rotation axis R.

The grooves 23 extend longitudinally along the rotation axis R. The length of the grooves 23 corresponds substantially to the length of the contact portions 85 of the sleeve 1. It will be noted that the circular end wall 25 here has a diameter identical to a diameter of the base 9.

The grooves 23 extend peripherally along a curve similar to the circular curve C, around the rotation axis R, the curve C here following the perimeter of the end wall 25. The width of the grooves 23 substantially corresponds to the width of the contact portions 85 of the sleeve 1.

Furthermore, the shaft 2 comprises ribs 26 in its internal volume 28 that extend therein. These ribs 26 extend longitudinally parallel to the rotation axis R of the shaft 2, between each of the longitudinal ends of the shaft 2. These ribs 26 also extend radially around the rotation axis R. These ribs 26 increase the contact surface between the internal wall of the shaft 2 and the coolant that circulates in the internal volume 28. They therefore act as thermal dissipater and therefore participate in a complementary manner in the cooling of the electrical machine.

The shaft is made from a metal material. In order to improve the heat transfer, the shaft 2 is preferably made from aluminum or an aluminum alloy. Indeed, aluminum, in addition to having good heat transfer properties, offers ease of manufacturing for the shaft 2, in particular for manufacturing by extrusion.

It should be noted that the coolant that circulates in the passages formed by the communication means 6 of the sleeve 1, then through the hollow shaft 2, can be either a liquid or gas. Non-limitingly, the following description considers here that the coolant is air.

Figure 7:
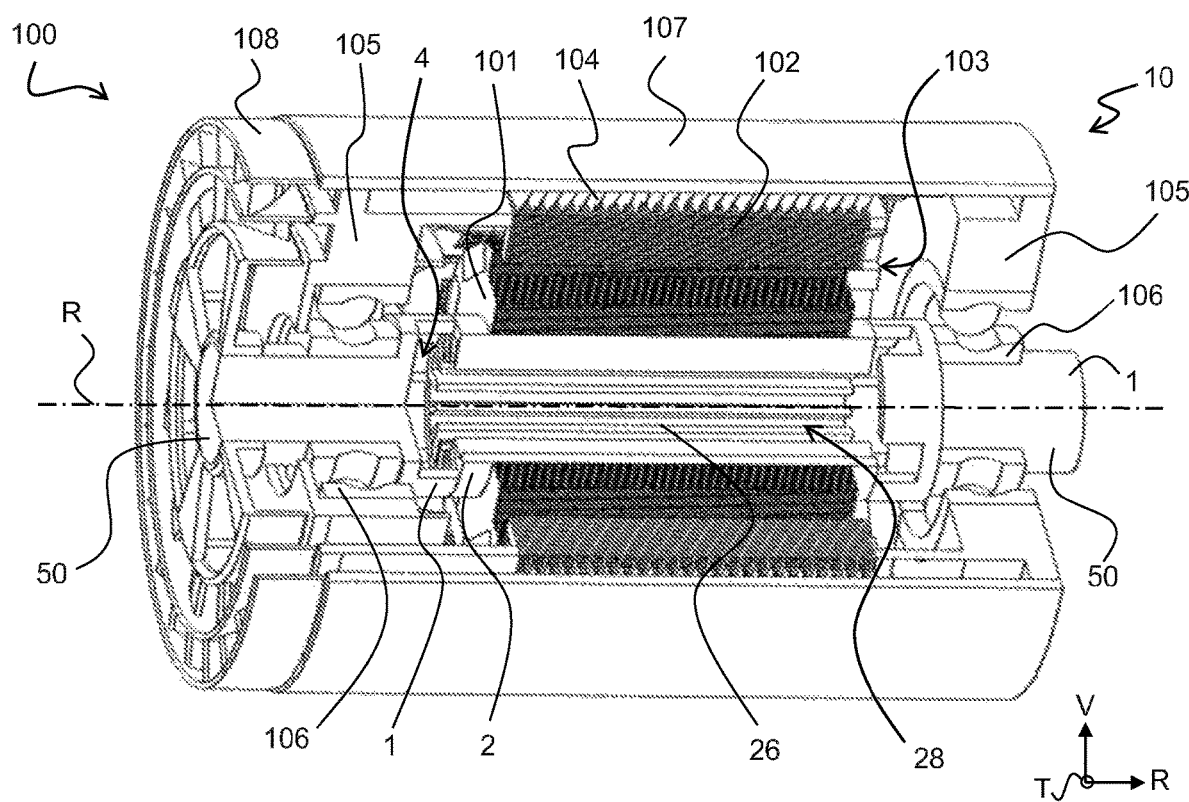
FIG. 7 is a partial sectional view of an electrical machine equipped with the assembly of FIG. 4.

FIG. 7 shows an electrical machine 100 comprising the assembly 10. The electrical machine 100 comprises, in addition to the two sleeves 1 and the shaft 2, a rotor 101 able to be rotated by the shaft 2, as well as a stator 102. An air gap 103 exists between the stator 102 and the rotor 101 forming a second coolant passage making it possible to cool the electrical machine 100.

The stator 102 is made by a stack of metal sheets on which windings are mounted forming a plurality of coils (not shown here). The coils have coil heads and each coil head protrudes longitudinally from the stack of metal sheets of the stator 102, along the rotation axis R of the sleeve 1. Each metal sheet of the stator 102 may optionally comprise at least one cooling fin 104 coming from its external periphery and thus allowing cooling of the external face of the stator 102, in particular when the electrical machine 100 comprises a third coolant passage allowing it to be cooled.

Furthermore, the electrical machine 100 may comprise at least one flange 105 positioned at a longitudinal end of the stator 102. In the example illustrated here, the electrical machine 100 comprises two flanges 105 each arranged at a longitudinal end of the stator 102. Each flange 105 makes it possible to keep the shaft 2 rotating the rotor 101 via the sleeve 1, then the rotational bearing 106, the latter, for example, may be a ball bearing.

The electrical machine 100 further comprises a jacket 107 overlapping the flanges 105 and the stator 102. The overlap is done along the rotation axis R of the rotor 1, along which the electrical machine 100 also extends. The jacket 107 is also not pressed against the cooling fins 104 of the stator 102, which participates in the third coolant passage, in particular by allowing a circulation thereof between the cooling fins 104 of the jacket 107.

To provide improved mixing of the air in the coolant passages mentioned above, an impeller 108 can be placed at a longitudinal end of the electrical machine 100. When the electrical machine 100 comprises two flanges 105, the impeller 8 is positioned against one of these two flanges 108 and can be rotatable via the trunnion 50 of the sleeve 1. In this case, the flange 105 intended to receive the impeller 108 comprises spacers defining, peripherally and transversely to the rotation axis R, openings allowing the circulation of the flow of air in the electrical machine 100. The opposite flange 105 in turn can either be open in order to allow air to exit toward the outside of the electrical machine 100, or closed in order to generate a circulation of the fluid in a U, for example a flow of air, in the electrical machine 100. In the case of a closed flange, the latter comprises peripheral openings for the circulation of the flow of air in a U, thus allowing the mixed air to form a loop inside the electrical machine 100 to next exit from the side where the impeller 108 is situated, in particular by the impulse thereof.

Alternatively, the impeller can be configured to be rotated by an independent electrical actuator of the electrical machine. Independent means that the electrical actuator is mechanically independent from the electrical machine. Preferably, the electrical actuator of the impeller 108 is fastened on the flange 105 of the electrical machine 100, in particular by being placed between the flange 105 and the impeller 108.

Thus, a flow of air circulates in the electrical machine 100 in a first direction, i.e., in a direction where the air is oriented away from the impeller 108 and toward the inside of the electrical machine 100. This flow of air circulates, for example, in the first fluid passages arranged through the sleeves 1 via the communication means 6, thus cooling the sleeve 1 while passing in the internal chamber 4, then in the shaft 2 of the electrical machine 100 while circulating in the internal volume 28, for example along the longitudinal ribs 26. This flow of air next circulates in the internal chamber 4 of the opposite sleeve 1, then can circulate in the air gap 103 situated between the rotor 101 and the stator 102 or use the third fluid passage situated between the jacket 107 and the stator 102, third passage in which the fins 104 of the stator 102 extend. In the case of an open opposite flange 105, the flow of air connects it directly from the electrical machine while following a circulation referred to as "I" parallel to the rotation axis R of the rotor 101 of the machine 100.

It is understood that in light of the nature of the coolant, other paths in the electrical machine 100 are possible. In particular, the flow of air can enter the electrical machine 100 by circulating along the external face of the stator 102, then return toward the impeller 108 by passing through the sleeves 1 and the shaft 2.

The invention described according to its various embodiments thus makes it possible to draw a substantial performance from an electrical propulsion machine of a vehicle, in particular a motor vehicle, while maintaining a limited bulk that makes it possible to position the electrical machine in the vehicle and limit its weight. With an identical bulk or weight, the performance of the electrical machine is increased, since its cooling is strengthened.

Of course, various changes can be made by one skilled in the art to the sleeve 1, the shaft 2 and the electrical machine 100 that accommodates them, inasmuch as the sleeve 1 and/or the shaft 2 previously described are made and/or have the main features of the fluid passage as they have been described in the present document. Indeed, the shaft 2 could for example carry the torque transfer walls 8 with the communication means 6 and the sleeve could, in this case, comprise the grooves 23. In other words, the assembly illustrated in FIG. 4 between the sleeve 1 and the shaft 2 could be reversed without going beyond the scope of the invention.

In any case, the invention cannot be limited solely to the exemplary embodiments specifically described in this document, and in particular extends to any equivalent means and any technically operative combination of these means.

The invention claimed is:

1. A sleeve providing a mechanical connection between a shaft of an electrical machine and a rotational bearing of the electrical machine comprising:
 a first portion arranged to cooperate with the shaft of the electrical machine, and a second portion arranged to cooperate with the rotational bearing, wherein the first portion defines at least one internal chamber and comprises at least one means of communication between an environment surrounding the sleeve and the internal chamber.

2. The sleeve according to claim 1, wherein the first portion comprises a plurality of torque transfer walls delimiting the internal chamber, at least two adjacent torque transfer walls of which are separated by at least one communication means.

3. The sleeve according to claim 2, wherein at least one torque transfer wall comprises a shoulder configured to form at least one longitudinal stop opposite the shaft.

4. The sleeve according to claim 3, wherein the shoulder is arranged on an internal face of the torque transfer wall.

5. The sleeve according to claim 2, wherein at least one torque transfer wall extends longitudinally along a rotation axis of the sleeve and from a base of the sleeve.

6. The sleeve according to claim 2, wherein the torque transfer walls are regularly angularly distributed around a rotation axis of the sleeve, an angular sector for a number N of torque transfer walls being equal to 360/N.

7. The sleeve according to claim 1, wherein the at least one communication means emerges radially from the first portion, relative to a rotation axis of the sleeve.

8. The sleeve according to claim 1, wherein the second portion is solid.

9. A hollow shaft for an electrical machine comprising:
an internal volume,
a central portion configured to receive a rotor of the electrical machine, and
at least one end portion configured to cooperate with at least one sleeve, wherein at least one end portion comprises, on an external periphery, at least one groove intended to cooperate with the sleeve.

10. The shaft according to claim 9, wherein said shaft comprises at least one longitudinal rib extending inside the internal volume and parallel to a rotation axis of the shaft.

11. An assembly for an electrical machine, comprising at least one sleeve and a hollow shaft,
said sleeve providing a mechanical connection between a shaft of the electrical machine and a rotational bearing of the electrical machine; said sleeve comprising a first portion arranged to cooperate with the shaft of the electrical machine, and a second portion arranged to cooperate with the rotational bearing, the first portion defining at least one internal chamber and comprising at least one means of communication between an environment surrounding the sleeve and the internal chamber;
said hollow shaft comprising an internal volume, a central portion configured to receive a rotor of the electrical machine, and at least one end portion configured to cooperate with at least one sleeve, the at least one end portion comprising, on an external periphery, at least one groove intended to cooperate with the sleeve;
wherein, the internal volume of the hollow shaft is in communication with the internal chamber of the sleeve.

12. The assembly according to claim 11,
wherein the first portion of the sleeve comprises a plurality of torque transfer walls delimiting the internal chamber, at least two adjacent torque transfer walls of which are separated by at least one communication means; and
wherein the groove of the shaft cooperates with a contact portion of the torque transfer wall of the sleeve.

13. The assembly according to claim 12, wherein an internal face of at least one torque transfer wall of the sleeve is flush with an internal surface of the shaft.

14. An electrical machine, comprising the assembly according to claim 11.

15. The electrical machine according to claim 14, characterized in that it is cooled by a coolant passing at least through the communication means of the sleeve.

* * * * *